3,087,793
PROCESS OF OXIDIZING HYDROGEN SULFIDE
TO ELEMENTAL SULFUR
Allan S. Hay, Schenectady, N.Y., assignor to General
Electric Company, a corporation of New York
No Drawing. Filed June 19, 1961, Ser. No. 117,835
8 Claims. (Cl. 23—225)

This invention relates to a process of oxidizing hydrogen sulfide to elemental sulfur which comprises passing oxygen and hydrogen sulfide either as a mixture or as separate streams, through a homogeneous solution of a catalyst comprising a tertiary amine and a cuprous salt. More particularly, this invention relates to the production of sulfur in its elemental form, i.e., as free or chemically uncombined sulfur, by oxidizing hydrogen sulfide with oxygen, in the presence of a homogeneous solution of a catalyst comprising a tertiary amine selected from the group consisting of aliphatic tertiary amines and cyclic tertiary amines and a cuprous salt soluble in the tertiary amine, said cuprous salt being capable of existing in the cupric state.

My process is applicable to conversion of hydrogen sulfide per se or to the removal of hydrogen sulfide from a gas stream containing hydrogen sulfide. For example, it can be used to remove hydrogen sulfide from an air or other oxygen-containing gas stream or an inert gas stream, e.g., an inert rare gas or a hydrocarbon gas from petroleum refining in which the hydrogen sulfide is an undesirable component.

I use the term "hydrocarbon gas" to designate those hyrocarbon compounds in the vapor phase at the temperature at which the hydrogen sulfide is oxidized in the presence of my catalyst. This term therefore includes those hydrocarbons which are liquid at room temperature but may be readily volatilized so that they may be introduced as a gas into the homogeneous solution of my catalyst which is maintained at a temperature high enough to prevent condensation of the hydrocarbon in the reaction zone.

Many natural gases and refinery gases such as the refinery off-gases contain hydrogen sulfide. It is desirable to remove this hydrogen sulfide not only because it is undesirable in these gases when used as fuels or as a chemical raw material, but also since it is a convenient source of sulfur which is valuable as a chemical raw material. These natural gases and refinery gases containing hydrogen sulfide are usually designated as sour gas. Many industrial processes produce hydrogen sulfide as a waste gas, usually as a mixture with one or more other gases. Because of the toxicity and unpleasant odor of hydrogen sulfide it must be removed from any other gases before they are vented to the atmosphere.

Another important use for the present process is in certain hydrocarbon refining operations. Hydrorefining of materials such as petroleum fractions, coal tars, shale oils, etc., is widely used both for the purpose of improving the characteristics of the distillate for use as a motor fuel and for removing impurities therefrom. For example, hydrodesulfurization may be effected on a hydrocarbon fraction containing sulfur in such combined forms as thiophenes and mercaptans by treating it at a temperature in the range of 500° F. and superatmospheric pressure in the presence of hydrogen to produce a combination of reactions including cracking any hydrogenation that cause the sulfur-bearing molecules to be converted into hydrogen sulfide and the corresponding hydrocarbons. Since hydrogen is necessary to the operation of this process the effluent from the reaction zone is separated into a hydrogen phase and a hydrocarbon phase and the hydrocarbon phase is recovered as desulfurized liquid product while the hydrogen phase is recycled to the reaction zone.

The process is effected in the presence of a metallic catalyst such as platinum, palladium, iron, cobalt, molybdenum, nickel, etc., or combinations of these such as cobalt-molybdenum usually in a lower oxide or sulfide form and dispersed as fine particles upon an inert refractory oxide carrier such as silica, alumina, etc. Although many of these catalysts are not unduly sensitive to sulfur, an overabundance of sulfur will cause the catalyst to lose activity and it is accordingly desirable to remove sulfur from the reaction zone as much as possible. Since the sulfur content of the feed stock cannot be changed, it is desirable to reduce the catalyst exposure to sulfur by removing hydrogen sulfide from the recycle gas. The process of this invention in combination with a hydrorefining process is extremely beneficial.

Hydrogen sulfide presently is removed from various gas streams by absorbing it from the gas stream by scrubbing the gas with an aqueous alkaline medium. Preferably, the alkaline medium is regenerable and may consist of such materials as diethanolamine which forms a loose chemical association with hydrogen sulfide to remove it from the recycle gas stream and which may be removed from contact with the gas stream, heated to drive off hydrogen sulfide and returned to contact with the gas stream in regenerated condition. Although this process effectively removes hydrogen sulfide from the gas stream, it does so by contacting the gas stream with an absorbing medium, then regenerating the absorbing medium to separate hydrogen sulfide from it and then circulating the restored absorbing medium back into contact with the gas stream. In addition to requiring all of these steps the hydrogen sulfide is recovered and must be disposed of, for example, by oxidation to sulfur which can be done in some of the processes as part of the regenerative cycle. Other difficulties are that the aqueous absorbing medium contaminates the recycle gas with absorbing medium and with water vapor which must subsequently be either removed or endured at the cost of diminished catalyst activity. The complexities of the various processes of removing hydrogen sulfide are evident from the article appearing in the January 7, 1961, issue of Chemical Week, on page 33.

Unexpectedly, I have now discovered a general, rapid and inexpensive method of oxidizing the hydrogen sulfide either alone or in an inert gas stream, to free sulfur, so that it may be readily removed and recovered as a useful and valuable raw material. This process comprises passing hydrogen sulfide and oxygen through a homogeneous solution of a catalyst comprising a cuprous salt and a tertiary amine. The catalyst may be in solution in a solvent in which the sulfur is either soluble or insoluble and precipitates out as formed.

It is to be understood that my reaction is not a direct reaction of oxygen with a hydrogen sulfide, but an oxidation involving participation of the copper catalyst system. Because of this, I may either have two separate gas streams, one containing the oxygen, and one containing the hydrogen sulfide, passing into the catalyst solution; or I may intermingle the two gas streams prior to introduction into the catalyst system. In either case, the hydrogen sulfide reacts with the oxidized form of the catalyst to produce water and sulfur and to regenerate the reduced form of the catalyst. The oxygen reoxidizes the reduced form of the catalyst back to the oxidized form, so that it may react with additional hydrogen sulfide. I may also pass oxygen into the catalyst system to preoxidize the catalyst and then pass in the hydrogen sulfide stream to reduce the catalyst and oxidize the hydrogen sulfide to sulfur. Such a technique is well suited for use in a multiple reactor assembly whereby one-half of the reactors are being regenerated with the oxygen-containing gas stream while the others are oxidizing the hydrogen sulfide to sulfur with the sulfur being removed by continuous filtration. By alternating the flow of the two gas streams and balancing the rate of flow of the gases and rate of alternating the flow of the gases, a continuous process is provided in which no excess oxygen will appear in the exit gas stream. This is especially desirable when using my process for removal of hydrogen sulfide from a hydrocarbon or other combustible gas stream.

In providing the catalyst comprising a cuprous salt and tertiary amine, the particular cuprous salt used has no effect on the type of product obtained. The only requirement is that the cuprous salt must be capable of existing in the cupric state and must form a complex with the tertiary amine that is soluble in the reaction medium. The necessity for being able to exist in the cupric state is based on my belief that the oxidation of hydrogen sulfide is accomplished by an intermediate formation of an activated cupric amine complex that reacts with the hydrogen sulfide to regenerate the cuprous amine complex. As far as I can determine, it is impossible to form this activated complex by starting originally with a cupric salt in making the copper-amine complex unless reducing conditions are present to form the cuprous salt in situ. Typical examples of the cuprous salt suitable for my process are cuprous chloride, cuprous bromide, cuprous sulfate, cuprous azide, cuprous tetraamine sulfate, cuprous acetate, cuprous propionate, cuprous palmitate, cuprous benzoate, etc. I prefer to use cuprous chloride, since it is the most readily available and it is entirely satisfactory for use in the catalyst system. Although cuprous sulfite is not known, cuprous sulfite can be used because it evidently is oxidized to cuprous sulfate. Cuprous salts such as cuprous iodide, cuprous sulfide, cuprous cyanide, cuprous thiocyanate, etc., are not suitable for use in my process, since they are either not soluble in tertiary amines or are not capable of existing as stable cupric salts. For example, cupric cyanide and cupric thiocyanate autogeneously decompose to the corresponding cuprous salt. Cuprous nitrate and cuprous fluoride are not known to exist but the amine complexes can be made in situ. Substitution of cupric chloride, cupric sulfate, cupric perchlorate and cupric nitrate for the cuprous salt gave no oxidation of the hydrogen sulfide in the presence of a tertiary amine.

Examples of tertiary amines which may be used in practicing my invention are the aliphatic tertiary amines, such as trimethylamine, triethylamine, tripropylamine, tributylamine, trisecondary propylamine, N-methyldiethylamine, N-propyldimethylamine, N-allyldiethylamine, 3-chloro - N,N' - dimethylpropylamine, N -butyldimethylamine, N-isopropyldiethylamine, N-benzyldimethylamine, N-benzyldioctylamine, N-chlorobenzyldioctylamine, N-cyclohexyldimethylamine, N-phenethyldimethylamine, N-benzyl-N-methylethylamine, N-bromobenzyl di(chlorophenethyl) - amine, N,N - dimethyl - 2 - phenylpropylamine, N,N-dimethyl-4-pentenyl amine, N,N-diethyl-2-methylbutyl amine, etc. When aliphatic tertiary amines are used, I prefer that at least two of the aliphatic groups be straight chain hydrocarbon groups.

Examples of cyclic amines are the pyridines, such as pyridine iteslf, quinuclidine, the N-alkyl pyrroles, the N-alkyl pyrrolidines, the N-alkyl piperidines, the quinolines, the isoquinolines, the N-alkyl tetrahydroquinolines, the N-alkyl tetrahydroisoquinolines, the N-alkyl morpholines, etc., including the ring-substituted products of these cyclic amines whereby one or more of the hydrogen atoms on the carbons forming the ring are substituted by groups which may be aliphatic (for example, methyl, ethyl, vinyl, propyl, propenyl, butyl, amyl, hexyl, heptyl, octyl, etc., and isomers and the homologues thereof), alkoxy (for example, methoxy, ethoxy, ethenoxy, propoxy, propenoxy, butoxy, etc., and isomers and homologues thereof), aryl (for example, phenyl, tolyl, dimethylphenyl, chlorophenyl, bromotolyl, naphthyl, chlorobromonaphthyl, etc., and isomers and homologues thereof), aryloxy (for example, phenoxy, toloxy, xyloxy, chlorophenoxy, naphthoxy, etc., and isomers and homologues thereof), and the like. The ring substituents may be the same or different hydrocarbon groups. It is understood that when piperidines, pyrroles, pyrrolidines, tetrahydroquinolines, tetrahydroisoquinolines are used they are tertiary amines whereby an alkyl hydrocarbon radical, such as those listed above for the ring substituents, is also attached to the amine nitrogen group.

In addition to the monoamines listed above, I may use polyamines wherein two or more tertiary amine groups, of the kind listed above for the monoamines, are attached to an aliphatic or cycloaliphatic nucleus, e.g., ethylene, diethyleneamine, propylene, butylene, pentylene, hexylene, cyclopentylene, cyclohexylene, etc. Typical examples of such amines are N,N,N',N'-tetramethylethylenediamine,
N,N,N',N'-tetraethylethylenediamine,
N,N,N',N'-tetrapropylethylenediamine,
N,N,N',N'-tetrabutylethylenediamine,
N,N,N',N',N''-pentamethyldiethylenetriamine,
N-butyl-N-octyl-N',N'-dimethylethylenediamine,
$N^1,N^1$-dibenzyl-$N^2,N^2$-dimethyl-1,2-propanediamine,
2-chloro-N,N,N',N'-tetraethyl-1,3-propanediamine,
N' - (3 - chloro-p-tolyl) - N,N - diethyl - N' - methyl - 1,3-propanediamine,
2-($\beta$-dimethylaminoethyl)pyridine,
N,N,N',N'-tetrabenzyl-3-butene-1,2-diamine,
N,N,N',N'-tetramethyl-2-butyne-1,4-diamine,
N,N,N',N'-tetraallylputrescine,
N,N,N',N'-tetramethyl-1,4-diphenylputrescine,
N,N,N',N'-tetraisopropyl-1,3-butanediamine,
N,N,N',N'-tetramethyl-1,3-cyclopentanediamine,
N,N,N',N'-tetramethyl-1,4-cyclohexanediamine, etc.

I have found that a particularly active catalyst is formed by using a diamine in which the two tertiary amine groups are separated by two or three carbon atoms, numerous examples of which have been given above.

The effect of an N-aryl group in tertiary amines, e.g., N,N-dimethylaniline, methyldiphenylamine, etc., is to reduce the basicity of the amine so that its ability to form the copper complex is greatly reduced. Further, the stability of the amine under oxidizing conditions is greatly reduced. Because of these two effects I prefer not to use tertiary amines having an N-aryl substituent.

Some of the most commonly occurring hydrocarbon gas streams containing hydrogen sulfide which may be freed of the hydrogen sulfide content by my process are the natural gases occurring from petroleum wells and the hydrocarbon gas streams generated in refineries known as refinery off-gas streams and those streams utilized as intermediates in refinery which result from the cracking of hydrocarbons which are utilized to reform various petroleum products or are recovered as low boiling liquids. In natural gas, the predominant hydrocarbon is methane, with varying amounts of ethane, propane, butane and isobutane, pentane and isopentane. In refinery gases, these same constituents predominate although some of the higher homologues and olefinic hydrocarbons such as ethylene, propylene, butene, isobutene, etc., may also be present. In addition, there are other hydrocarbon streams which are liquid at room temperature, but which volatilize at relatively low temperatures, and while in the vapor phase, may be freed from hydrogen sulfide by my process. For example, since my catalyst system may be maintained at any temperature up to and including the boiling point of the solvent at the particular pressure maintained on the system, it is possible to remove hydrogen sulfide from normally liquid hydrocarbons by utilizing a solvent for my catalyst system which will have a boiling point high enough that the liquid hydrocarbon will be in the vapor state. Therefore, I may remove hydrogen sulfide from such hydrocarbons as benzene, toluene, xylene, cyclopentane, cyclopentene, cyclohexane, octane, nonane, etc., and mixtures thereof.

I may use mixtures of tertiary amines and mixtures of cuprous salts for forming my catalyst system. The copper-amine complex is dissolved in the solvent before the hydrocarbon containing hydrogen sulfide is admitted. In some cases, the solution of the copper-amine complex may be hastened by heating the mixture, by bubbling in air or oxygen, or a combination thereof. In order to effectively use all of the copper, enough amine should be added to complex and thereby dissolve all of the added cuprous salt. Larger excesses of amine do not adversely affect the reaction, and in some cases, may be desirable in order to increase the volume of the liquid phase. Other solvents such as alcohols, ketones, hydrocarbons, chlorohydrocarbons, nitrohydrocarbons, ethers, esters, amides, mixed ether esters, sulfoxides, etc., may be present in the reaction system providing they do not interfere or enter into the oxidation reaction.

Oxygen or an oxygen-containing gas is bubbled into the reaction mixture causing an exothermic reaction to take place with the formation of water as a by-product. It is preferable to prevent the escape of this water of reaction from the reaction vessel when carrying out the reaction by the batch process or to control the escape of water so that there is always one mole of water present for each mole of copper catalyst when carrying out the reaction by the batch or continuous process. This can be done by carrying out the reaction under reflux conditions, in a closed reaction system at superatmospheric pressure, by cooling, in the presence of dessicants, or any combination thereof, with a controlled removal of water if desired. This can be done, for example, by sweeping with an inert gas, by carrying out the reaction at subatmospheric pressure, by azeotropic distillation, by the use of open reaction vessels, by heat or any combination thereof.

In carrying out my reaction, the oxygen can be diluted with an inert gas such as nitrogen, helium, argon, etc., or air can be used. By controlling the ratio of oxygen to inert gas and the inlet temperature of this mixture, I can conveniently sweep the reaction mixture to cause removal of all of the water as it is formed if desired.

Since the reaction is usually exothermic, the reaction can become overheated, resulting in the formation of undesirable products. Generally, I initiate the oxidation reaction at as low a temperature as the reaction will start, as evidenced by the reaction becoming exothermic. Usually, I control my oxidation reaction so that the maximum temperature does not exceed 100° C., and preferably does not exceed 80° C. The heat of reaction may be removed, for example, by radiation, convection, or by cooling coils which can either be immersed in or surround the reaction vessel.

Ordinarily, for a single stage reaction, I continue the passage of oxygen as long as I continue passing in the hydrogen sulfide. Since nominally the sulfur will precipitate, it may be removed from the reaction by means of filtration, centrifugation, etc., either continuously or on a batchwise basis, and the catalyst returned to the reaction vessel. In this way I may operate on either a continuous or a batchwise process for the conversion of hydrogen sulfide to sulfur or removal of the hydrogen sulfide from a gas stream. If the solvent also dissolves the sulfur, I may either continue the reaction and exceed the saturation point so that the sulfur precipitates from the solution and recover it, or I may distill some of the solvent in order to permit recovery of some of the sulfur, in a batchwise method on a portion of the reaction mixture, while still continuing the flow of hydrogen sulfide on a continuous basis for the balance of the reaction medium. Alternatively, I may destroy the catalyst system by the addition of an acid, preferably a mineral acid such as hydrochloric or sulfuric acid, which reacts with the tertiary amine and cuprous salt, then isolate the sulfur from the solvent. A two stage process has previously been described above.

After the sulfur is isolated, it may be dissolved and precipitated any desirable number of times to remove impurities or washed with a liquid which dissolves the impurities but not the sulfur. The chief impurity will be a minor amount of copper which is precipitated along with the sulfur as an insoluble copper sulfide. The amount of copper sulfide formed is somewhat dependent on the solvent used. Strongly polar solvents, e.g., alkyl sulfoxides, ketones, etc., minimize the formation of copper sulfide. For a given solvent, a slow rate of introduction of hydrogen sulfide also favors obtaining a purer product. Converting all of the catalyst to the oxidized form with oxygen before the hydrogen sulfide flow is initiated also aids in obtaining a purer product. This copper may be recovered and reconverted back into cuprous salt to be returned to the catalyst system.

In order that those skilled in the art may better understand my invention, the following examples are given which are illustrative of the practice of my invention, and are not intended for purposes of limitation. In the examples, all parts are by weight unless otherwise stated.

*Example 1*

Oxygen was bubbled through a vigorously stirred solution of 0.5 gram of cuprous chloride and 3.5 grams of N,N'-dimethyl-N,N'-didecylethylenediamine in 135 ml. of carbon disulfide until all of the cuprous chloride had dissolved. At this point, hydrogen sulfide was also bubbled into the reaction solution while continuing the flow of oxygen. A vigorous reaction ensued for the entire period but at the end of 6 minutes the reaction was stopped by pouring the solution into 500 ml. of methanol to isolate a brown solid. Washing the solid with nitric acid removed the brown color which was due to copper sulfide and left the bright yellow crystalline solid which was identified as sulfur.

Similar results were obtained when Example 1 was repeated but substituting N-decyl-N,N',N'-triethylethylenediamine in pyridine in place of the N,N'-dimethyl-N,N'-didecylethylenediamine and carbon disulfide.

*Example 2*

Oxygen was bubbled through a vigorously stirred solution of 1 gram of cuprous chloride and 2.4 grams of N,N',N'-tetramethylethylenediamine in 135 ml. of dimethylsulfoxide until all of the cuprous chloride had dissolved. At this point, hydrogen sulfide was also bubbled into the reaction solution while continuing the flow of oxygen. A very exothermic reaction took place, the temperature being maintained about 45° C. by controlling the rate of addition of hydrogen sulfide. Sulfur precipitated from the solution and can be removed by bypassing the stream of the solution through a filter. At the end of 3 hours, the reaction was stopped, the solution cooled, and the precipitate filtered from the reaction medium, to give a light brown precipitate. The precipitate was dissolved in hot toluene and filtered, leaving a very small amount of a brown precipitate on the filter paper which was identified as copper sulfide. On cooling the hot toluene solution, bright yellow crystals, identified as sulfur, were obtained. An additional amount of sulfur could be recovered from the reaction mixture by diluting it with a large quantity of water.

Similar results were obtained when the procedure of Example 2 was repeated but substituting acetone for the dimethyl sulfoxide.

In the same manner as illustrated in Examples 1 and 2, hydrogen sulfide may be readily removed from an air or inert gas, oxygen, or hydrocarbon gas stream containing hydrogen sulfide by substituting such gas for the hydrogen sulfide in the procedure given in Examples 1 or 2. If the amount of oxygen present in the air or oxygen gas stream is sufficient to oxidize all of the hydrogen sulfide content of the gas stream, no additional oxygen will need to be added. The ability of my process to remove hydrogen sulfide from a gas stream is illustrated by the following example.

*Example 3*

It is desirable that there be no excess of oxygen in the purified natural gas stream. Although this can be done by controlling the flow rate of the oxygen and the natural gas stream being purified to maintain stoichiometric balance (one volume of oxygen is required for each 2 volumes of hydrogen sulfide), or, alternatively, by removing the excess oxygen by passing the effluent gas stream through an oxygen absorber, e.g., an aqueous alkaline pyrogallol solution, or by refrigeration. However, for this application, a very efficient and easily controlled system is to have a series of two or more reactors arranged in two banks. In this example, two closed reaction vessels, each having an inlet connected to a gas disperser, an outlet, and containing the quantity and composition of the solution of Example 2, are used, although a series or bank of containers could be joined together if desired. Air is passed into one of the reactors until no more oxygen is absorbed and the copper-amine complex has been converted from the cuprous to cupric state. Natural gas containing approximately 2% hydrogen sulfide by volume is now passed into this reactor at a flow rate of about 100 ml. per minute while simultaneously passing air into the second reactor. The natural gas effluent from the first reactor is found to be free from detectable hydrogen sulfide and is suitable as a fuel or for other well known uses.

After 5 liters of natural gas at ambient condition is freed of its hydrogen sulfide by passing through the first reactor (solution capacity approximately 5.6 liters S.T.P. of natural gas containing 2% hydrogen sulfide), the natural gas is changed to flow through the second reactor while the first reactor is regenerated with air. As a safety precaution, the residual natural gas is first displaced with nitrogen before starting the flow of air. Sulfur precipitates soon after the flow of air is started. Since the volume of air required to regenerate the catalyst is only one-twentieth the volume of the natural gas containing 2% hydrogen sulfide being treated, the flow rate of air can be one-twentieth that of the natural gas if the sulfur is simultaneously filtered from the solution, for example, by a filter placed in a by-pass line of the reactor. However, in this instance, the flow rate of the air is the same as that of the natural gas, permitting the reactivation reaction to be completed and the solution filtered free of sulfur before it is necessary to place the reactor back in service to remove hydrogen sulfide from the natural gas so that the other reactor may be reactivated. The above cycle can be repeated as many times as desired to continuously remove hydrogen sulfide from the natural gas.

Modifications may be made to Example 3 to suit the particular conditions. Generally, I prefer to use an excess flow of air or oxygen to regenerate the reactors to insure complete regeneration. Since the volume of solid sulfur is small compared to the volume of gas treated, it is not necessary to remove the sulfur after each regeneration. Any of the various means used in gas scrubbers may be used to insure efficient contacting of the gas and solution.

The sulfur obtained by my process may be used for any of the many and wide varieties of uses for which sulfur is a raw material. The hydrocarbon stream which has been freed from the hydrogen sulfide may be used as a fuel or as a raw material for chemical reactions, for example, in the making of sulfur-free petroleum reformates and so forth.

Obviously, other modifications and variations of the present invention are possible in the light of the above teachings. It is therefore to be understood that changes may be made in the particular embodiments of the invention described which are within the full intent and scope of the invention, as defined by the appended claims.

What I claim as new and desire to secure by Letters Patent of the United States is:

1. The process of oxidizing hydrogen sulfide to free sulfur which comprises reacting oxygen with hydrogen sulfide in the presence of a solution of a cuprous salt-tertiary amine complex, said cuprous salt being capable of existing in the cupric state.

2. The process of claim 1 wherein the hydrogen sulfide is a component of a mixture containing a hydrocarbon gas.

3. The process of claim 2 wherein the hydrocarbon gas is natural gas.

4. The process of claim 1 wherein the cuprous salt is cuprous chloride.

5. The process of claim 1 wherein the tertiary amine is an alkylene diamine.

6. The process of claim 1 wherein the cuprous salt is cuprous chloride and the tertiary amine is an alkylene diamine.

7. The process of claim 1 wherein the oxygen is first reacted with the cuprous salt-tertiary amine complex to form an oxidized complex, thereafter reacting the hydrogen sulfide with the oxidized complex.

8. The process of claim 1 wherein oxygen and hydrogen sulfide are concurrently introduced into the solution of the complex.

References Cited in the file of this patent

UNITED STATES PATENTS

| | | |
|---|---|---|
| 737,579 | Burschell | Sept. 1, 1903 |
| 2,742,347 | Carlson | Apr. 17, 1956 |
| 2,765,217 | Conroy et al. | Oct. 2, 1956 |
| 2,972,522 | Urban | Feb. 21, 1961 |
| 2,987,379 | Urban | June 6, 1961 |

FOREIGN PATENTS

| | | |
|---|---|---|
| 319,396 | Great Britan | Sept. 20, 1929 |